United States Patent
Koshika et al.

(10) Patent No.: US 11,967,713 B2
(45) Date of Patent: Apr. 23, 2024

(54) POSITIVE ELECTRODE ACTIVE MATERIAL FOR NON-AQUEOUS ELECTROLYTE SECONDARY BATTERY COMPRISING TUNGSTEN COATING FILM, AND NON-AQUEOUS ELECTROLYTE SECONDARY BATTERY

(71) Applicant: SUMITOMO METAL MINING CO., LTD., Tokyo (JP)

(72) Inventors: Yuki Koshika, Ehime (JP); Haruki Kaneda, Ehime (JP); Jun Yokoyama, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 675 days.

(21) Appl. No.: 17/059,306

(22) PCT Filed: May 29, 2019

(86) PCT No.: PCT/JP2019/021361
§ 371 (c)(1),
(2) Date: Nov. 27, 2020

(87) PCT Pub. No.: WO2019/230829
PCT Pub. Date: Dec. 5, 2019

(65) Prior Publication Data
US 2021/0167378 A1    Jun. 3, 2021

(30) Foreign Application Priority Data

May 31, 2018    (JP) .................................. 2018-105615

(51) Int. Cl.
| | |
|---|---|
| *H01M 4/525* | (2010.01) |
| *H01M 4/36* | (2006.01) |
| *H01M 4/505* | (2010.01) |
| *H01M 4/58* | (2010.01) |
| *H01M 10/052* | (2010.01) |
| *H01M 4/02* | (2006.01) |

(52) U.S. Cl.
CPC ........... *H01M 4/525* (2013.01); *H01M 4/366* (2013.01); *H01M 4/505* (2013.01); *H01M 2004/028* (2013.01); *H01M 4/58* (2013.01); *H01M 10/052* (2013.01)

(58) Field of Classification Search
CPC ........ H01M 4/525; H01M 4/58; H01M 4/505; H01M 10/052; H01M 2004/028
See application file for complete search history.

(56) References Cited

U.S. PATENT DOCUMENTS

| | | |
|---|---|---|
| 9,130,212 B1 | 9/2015 | Kokado et al. |
| 2014/0087263 A1 | 3/2014 | Matsumoto et al. |

(Continued)

FOREIGN PATENT DOCUMENTS

| | | |
|---|---|---|
| EP | 2624342 | 8/2013 |
| EP | 3136480 | 3/2017 |

(Continued)

OTHER PUBLICATIONS

International Search Report dated Jul. 9, 2019 with respect to PCT/JP2019/021361.

*Primary Examiner* — Christopher P Domone
*Assistant Examiner* — Kimberly Wyluda
(74) *Attorney, Agent, or Firm* — IPUSA, PLLC (57) ABSTRACT

The present invention relates to a positive electrode active material for non-aqueous electrolyte secondary battery, including lithium-nickel composite oxide particles having a layer structure of hexagonal system; and a lithium tungstate coating film disposed on a surface of secondary particles of the lithium-nickel composite oxide particles, wherein the positive electrode active material for non-aqueous electrolyte secondary battery includes, as metallic elements, lithium (Li), nickel (Ni), cobalt (Co), element M (M) which is at least one element selected from Mn, V, Mg, Mo, Nb, Ti, Ca, Cr, Zr, Ta, and Al, and tungsten (W), wherein a ratio of (Continued)

amount of substance in the metallic elements contained is Li:Ni:Co:M:W=a:1-x-y:x:y:z, wherein $0.97 \leq a \leq 1.25$, $0 \leq x \leq 0.35$, $0 \leq y \leq 0.35$, and $0.005 \leq z \leq 0.030$.

5 Claims, 4 Drawing Sheets

(56) References Cited

U.S. PATENT DOCUMENTS

| | | |
|---|---|---|
| 2018/0123118 A1 | 5/2018 | Furuichi et al. |
| 2018/0287143 A1 | 10/2018 | Ozaki et al. |
| 2018/0337403 A1 | 11/2018 | Komukai et al. |
| 2019/0020023 A1 | 1/2019 | Yokoyama et al. |

FOREIGN PATENT DOCUMENTS

| | | | |
|---|---|---|---|
| EP | 3226330 | 10/2017 | |
| EP | 3226331 | 10/2017 | |
| EP | 3288104 | 2/2018 | |
| JP | 2005-251716 | 9/2005 | |
| JP | 2010-040383 | 2/2010 | |
| JP | 2012-079464 | 4/2012 | |
| JP | 2013-125732 | 6/2013 | |
| JP | 2013-152866 | 8/2013 | |
| JP | 2016-111000 | 6/2016 | |
| JP | 2016-207635 | 12/2016 | |
| JP | 2017-084513 | 5/2017 | |
| JP | 2017-084628 | 5/2017 | |
| WO | 2016/084930 | 6/2016 | |
| WO | WO-2017073246 A1 * | 5/2017 | ............. C01G 53/42 |

* cited by examiner

POSITIVE ELECTRODE ACTIVE MATERIAL FOR NON-AQUEOUS ELECTROLYTE SECONDARY BATTERY COMPRISING TUNGSTEN COATING FILM, AND NON-AQUEOUS ELECTROLYTE SECONDARY BATTERY

TECHNICAL FIELD

The present invention relates to a positive electrode active material for a non-aqueous electrolyte secondary battery and a non-aqueous electrolyte secondary battery.

BACKGROUND OF THE INVENTION

In recent years, with the spread of portable electronic devices such as cellular phones and notebook PCs, there is a strong need for the development of small, lightweight, non-aqueous electrolyte secondary batteries with high energy density. In addition, the development of high-output secondary batteries for electric vehicles such as hybrid vehicles is strongly desired.

Lithium ion secondary batteries have been proposed as secondary batteries that satisfy such requirements. A lithium ion secondary battery is configured by, for example, a negative electrode, a positive electrode and an electrolyte, or the like. Active materials of the negative electrode and the positive electrode are materials that can intercalate and deintercalate lithium ions.

Such lithium ion secondary batteries are currently being extensively researched and developed. Among them, lithium ion secondary batteries that use layered or spinel-type lithium metal composite oxide as a positive electrode material are capable of obtaining high voltages of 4V class, and thus have being practically used in progress as batteries with high energy density.

Examples of the positive electrode materials, that have been mainly proposed, include a lithium-cobalt composite oxide ($LiCoO_2$) which is relatively easy to synthesize, a lithium-nickel composite oxide ($LiNiO_2$) which uses nickel that is less expensive than cobalt, a lithium-nickel-cobalt-manganese composite oxide ($LiNi_{1/3}Co_{1/3}Mn_{1/3}O_2$), a lithium-manganese composite oxide ($LiMn_2O_4$) which uses manganese, and the like.

Of these, lithium-nickel composite oxides and lithium-nickel-cobalt-manganese composite oxides have attracted attention as positive electrode materials that can obtain high capacity. However, further improvement of performance is demanded, and in particular, improvement of the resistance to short-circuit that affects thermal runaway during short-circuit and reduction of resistance required for high output are strongly required.

As a method of achieving low resistance, an addition of different elements is adopted. Especially, an addition of a transition metal which can obtain a high valence such as W, Mo, Nb, Ta, Re, or the like is considered useful.

For example, Patent Document 1 discloses a positive electrode active material for a non-aqueous electrolyte secondary battery having at least a layered structure of a lithium transition metal composite oxide. The lithium transition metal composite oxide is in the form of primary particles and secondary particles, in which the secondary particles are formed by aggregation of the primary particles, and the lithium transition metal composite oxide is present in the form of at least one of primary particles and secondary particles. The surfaces of particles of lithium transition metal composite oxide have at least one type of compound selected from the group consisting of molybdenum, vanadium, tungsten, boron, and fluorine.

In addition, Patent Document 2 discloses a method of manufacturing a positive electrode active material. The method includes a deposition step in which a tungsten acid compound is deposited on a composite oxide particle including lithium (Li) and nickel (Ni) and a heating step in which the composite oxide particle having the tungsten acid compound is heated.

However, Patent Document 1 was an invention to improve initial characteristics, that is, the initial discharge capacity and the initial efficiency. In addition, Patent Document 2 was an invention to suppress gas generation caused by decomposition of a non-aqueous electrolyte solution. Accordingly, neither of these Patent Document 1 and 2 disclosed short-circuit resistance output characteristics.

In contrast, it has been proposed to improve output characteristics by forming fine particles containing lithium tungstate on the surface of a lithium-nickel composite oxide.

For example, Patent Document 3 discloses a lithium-nickel composite oxide containing primary particles and secondary particles, in which secondary particles are formed by aggregation of primary particles. A positive electrode active material for a non-aqueous electrolyte secondary battery includes fine particles containing lithium tungstate represented by $Li_2WO_4$, $Li_4WO_5$, or $Li_6W_2O_9$ on the surface of the lithium-nickel composite oxide.

In addition, Patent Document 4 discloses a positive electrode active material for a non-aqueous electrolyte secondary battery characterized by having a lithium tungstate compound or its hydrate in a layered form or an island form on the surface of primary particles of lithium metal composite oxide.

According to these techniques, high output and high capacity are obtained when used for the positive electrode material. However, none of the techniques studied short-circuit resistance.

RELATED-ART DOCUMENT

Patent Documents

Patent Document 1: Japanese Laid-Open Patent Publication No. 2005-251716
Patent Document 2: Japanese Laid-Open Patent Publication No. 2010-040383
Patent Document 3: Japanese Laid-Open Patent Publication No. 2013-125732
Patent Document 4: Japanese Laid-Open Patent Publication No. 2013-152866

SUMMARY OF THE INVENTION

Problems to be Solved by the Invention

In view of the above-described problems in the prior art, in one aspect of the invention, an object of the present invention is to provide a positive electrode active material for a non-aqueous electrolyte secondary battery having a high short-circuit resistance and excellent output characteristics when used in a non-aqueous electrolyte secondary battery.

Means for Solving the Problems

According to one aspect of the present invention, a positive electrode active material for non-aqueous electrolyte secondary battery, includes lithium-nickel composite oxide particles having a layer structure of hexagonal system; and a lithium tungstate coating film disposed on a surface of secondary particles of the lithium-nickel composite oxide particles, wherein the positive electrode active material for non-aqueous electrolyte secondary battery includes, as metallic elements, lithium (Li), nickel (Ni), cobalt (Co), element M (M) which is at least one element selected from Mn, V, Mg, Mo, Nb, Ti, Ca, Cr, Zr, Ta, and Al, and tungsten (W), wherein a ratio of amount of substance in metallic elements contained is Li:Ni:Co:M:W=a:1-x-y:x:y:z, wherein $0.97 \le a \le 1.25$, $0 \le x \le 0.35$, $0 \le y \le 0.35$, and $0.005 \le z \le 0.030$, and wherein a ratio of a maximum tungsten concentration to an average tungsten concentration is 5 or more and 25 or less when a line analysis is performed by STEM-EDX on a particle cross-section of the positive electrode active material for non-aqueous electrolyte secondary battery.

Effects of the Invention

According to an aspect of the invention, it is possible to provide a positive electrode active material for a non-aqueous electrolyte secondary battery that exhibits a high short-circuit resistance and excellent output characteristics when used in a non-aqueous electrolyte secondary battery.

DETAILED DESCRIPTION

Hereinafter, embodiments for carrying out the present invention will be described with reference to the drawings. However, the present invention is not limited to the following embodiments, and the following embodiments can be variously modified and replacements can be made to the embodiment without departing from the scope of the present invention.

[Positive Electrode Active Material for Non-Aqueous Electrolyte Secondary Battery]

A positive electrode active material for a non-aqueous electrolyte secondary battery (hereinafter, also referred to as a "positive electrode active material") in accordance with the present embodiment includes lithium-nickel composite oxide particles having a layered structure of hexagonal system and a coating of lithium tungstate disposed on the surface of secondary particles of the lithium-nickel composite oxide particles.

The positive electrode active material for the non-aqueous electrolyte secondary battery according to the present embodiment can contain lithium (Li), nickel (Ni), cobalt (Co), element M (M), and tungsten (W) as metallic elements. Then, a ratio of amount of substance in metal elements contained can be Li:Ni:Co:M:W=a:1-x-y:x:y:z.

The element M may be at least one element selected, from manganese (Mn), vanadium (V), magnesium (Mg), molybdenum (Mo), niobium (Nb), titanium (Ti), calcium (Ca), chromium (Cr), zirconium (Zr), tantalum (Ta), and aluminum (Al).

Further, in the equation of the ratio of the amount of substance in the metal element contained in the above, the values a, x, y, and z can be $0.97 \le a \le 1.25$, $0 \le x \le 0.35$, $0 \le y \le 0.35$, and $0.005 \le z \le 0.030$, respectively.

Then, when a line analysis is performed by STEM-EDX on a cross-section of the positive electrode active material for the non-aqueous electrolyte secondary battery in the present embodiment, a ratio of a maximum tungsten concentration to an average tungsten concentration can be 5 or more and 25 or less.

The inventors of the present invention diligently investigated the present invention in order to achieve the positive electrode active material which exhibits high resistance to short-circuits and excellent output characteristics when applied to a non-aqueous electrolyte secondary battery.

Powder characteristics and battery characteristics of lithium-nickel composite oxide, which is used as the positive electrode active material, were thoroughly investigated. As a result, the present invention has been completed by finding that forming a lithium tungstate coating on the surface of the secondary particles of the lithium-nickel composite oxide and locally increasing a tungsten concentration in the particles of the positive electrode active material greatly improve a short-circuit resistance and output characteristics.

The positive electrode active material of the present embodiment is achieved by forming a lithium tungstate coating on the surface of the secondary particles of the lithium-nickel composite oxide and locally increasing the tungsten concentration in the particles of the positive electrode active material. Therefore, an electrical resistance during powder compression is extremely high, and the short-circuit resistance can be improved. The positive electrode active material according to the present embodiment has the lithium tungstate coating disposed on the surface of the secondary particles of the lithium-nickel composite oxide as described above. The coating of lithium tungstate reduces the interface resistance, and thus has excellent output characteristics.

Generally, if the surface of the material that functions as the positive electrode active material is completely coated with heterogeneous compounds, the electrical resistance improves and the short-circuit resistance property improves. However, a movement (intercalation) of lithium ions is greatly limited, and as a result, the resistance of the lithium-nickel composite oxide increases, and the output characteristics deteriorate.

In contrast, in the positive electrode active material according to the present embodiment, a lithium tungstate coating is formed on the surface of the secondary particles of the lithium-nickel composite oxide, but lithium tungstate has a high lithium ion conductivity and an effect of promoting the movement of lithium ions. Therefore, the lithium tungstate coating is formed on the surface of the lithium-nickel composite oxide particles to form a lithium conduction path at the interface with the electrolyte; accordingly, it is possible to reduce the positive electrode resistance (reaction resistance) of the positive electrode active material and improve the output characteristic. That is, a reduction in the positive electrode resistance reduces the voltage lost in the battery, and the voltage applied to a load side becomes relatively high, resulting in a high output. In addition, lithium tungstate has low electron conductivity, and by suppressing the flow of short-circuit current through the surface of active material (surface layer) when the battery is short-circuited, the short-circuit resistance of the battery can be improved.

The composition of the positive electrode active material according to the present embodiment is not particularly limited, but as described above, lithium (Li), nickel (Ni), cobalt (Co), element M (M), and tungsten (W) can be contained as metal elements.

As is obvious from the ratio of the amount of substance in the metal element contained in the following, the positive electrode active material according to the present embodiment may not contain cobalt and element M. Thus, the positive electrode active material of the present embodiment may include, for example, lithium, nickel, tungsten, and optionally, cobalt or element M.

Then, the ratio of the amount of substance in the metal element contained can be $Li:Ni:Co:M:W = a:1-x-y:x:y:z$.

In the present embodiment, the composition of the active material for the positive electrode refers to the composition including a lithium-nickel composite oxide as a base material and the lithium tungstate coating disposed on the surface of the secondary particles of the lithium-nickel composite oxide. The composition of the positive electrode active, material can be calculated by analyzing the positive electrode active material according to the present embodiment, for example, by an inductively coupled plasma (ICP) emission spectroscopy.

A range of x representing a Co content of the positive electrode active material in the present embodiment is preferably $0 \leq x \leq 0.35$ and more preferably $0.05 \leq x \leq 0.25$. If a value of x is within the above range, a positive electrode active material with high capacity and 0.5 high output characteristics can be obtained. Specifically, an excess proportion of cobalt can be suppressed and the proportion of nickel of which the valence can be varied during charge-discharge can sufficiently increase by adjusting the value of x to 0.35 or less. For this reason, a withdrawn amount of lithium can be secured and a charge-discharge capacity can be increased. In addition, when the value of x is set to 0 or more, the positive electrode resistance can be reduced, and the capacity decrease in the repeated charge-discharge can be suppressed.

An element M, which is an optional adding element, may be at least, one element selected from Mn, V, Mg, Mo, Nb, Ti, Ca, Cr, Zr, Ta, and Al. That is, one or more elements selected from the group of elements of the above can be used.

Further, y representing element M content of the positive electrode active material in the present embodiment is preferably $0 \leq y \leq 0.35$ and more preferably $0.01 \leq y \leq 0.20$. The positive electrode active material in the present embodiment contains the element M, and thus thermal stability, storage characteristics, battery characteristics, and the like can be improved. For example, when the positive electrode active material of the present embodiment contains Mn as the element M, the positive electrode active material with excellent thermal stability can be obtained.

Since the element M is an optionally added element as described above, the positive electrode active material in the present embodiment may not contain element M. Therefore, the content of y representing the content of element M may be 0 or more. In addition, from the viewpoint of sufficiently increasing the ratio of other elements, such as nickel, and enhancing the battery characteristics, y which indicates the content of the element M is 0.35 or less.

A range of z representing the tungsten content of the positive electrode active material in the present embodiment is preferably $0.005 \leq z \leq 0.030$ and more preferably $0.007 \leq z \leq 0.020$.

In the positive electrode active material of the present embodiment, tungsten exists as a coating film of lithium tungstate on the surface of the secondary particles of lithium-nickel composite oxide. Therefore, when the value of z is in the above-described range, the positive electrode active material with excellent short-circuit resistance and high output characteristics can be obtained. Specifically, the output characteristics and the short-circuit resistance can be increased by adjusting the value of z to be 0.005 or more. In addition, the proportion of lithium-nickel composite oxide in the positive electrode active material can be sufficiently increased and the charge-discharge capacity can be increased by adjusting the value of z to be 0.030 or less.

A range of a representing the lithium content of the positive electrode active material in the present embodiment is preferably $0.97 \leq a \leq 1.25$. If the range of a is within the above range, the positive electrode resistance of the positive electrode decreases and the output of the battery improves.

The positive electrode active material in the present embodiment contains a lithium-nickel composite oxide, and the lithium-nickel composite oxide preferably has a layered structure of hexagonal system. It is also preferable that the lithium-nickel composite oxide has primary particles and secondary particles, in which the secondary particles are formed by aggregation of the primary particles.

The secondary particles in the lithium-nickel composite oxide of the positive electrode active material in the present embodiment contact each other at the surface of the secondary particles. It is preferable that a lithium tungstate coating is disposed on the surface of the secondary particles of the lithium-nickel composite oxide in order to enhance the short-circuit resistance. At this time, the lithium tungstate is concentrated on the surface of the secondary particles of the lithium-nickel composite oxide and sufficiently coated, thereby achieving an extremely large improvement in resistance to short-circuits.

Therefore, in the cross-section of the particles of the positive electrode active material in the present embodiment, the ratio of the maximum tungsten concentration to the average tungsten concentration is preferably 5 or more and 25 or less when a line analysis is conducted by using a Scanning Transmission Electron Microscope-Energy Dispersive X-ray spectrometry (STEM-EDX).

The particles of the positive electrode active material in the present embodiment include secondary particles of lithium-nickel composite oxide and lithium tungstate coating disposed on the surface of the secondary particles. Most of the cross-sections of the particles of the positive electrode active material are formed by the secondary particles of lithium-nickel composite oxide. Thus, the cross-section of the particles in the positive electrode active material can be referred to as cross-section of secondary particles of lithium-nickel composite oxide.

As described above, a ratio of maximum tungsten concentration to average tungsten concentration in the cross-section of the particles of the positive electrode active material in the present embodiment (hereinafter, also referred to as "tungsten concentration ratio"), that is, a tungsten concentration ratio obtained by the maximum tungsten concentration to the average tungsten concentration is preferably 5 or more and 25 or less.

The tungsten concentration in the cross-section of the particles of the positive electrode active material used to calculate the tungsten concentration ratio can be confirmed by analyzing the composition of the cross-section of the secondary particles by a STEM-EDX analysis.

The tungsten concentration ratio can be calculated, for example, by the following procedure.

For the positive electrode active material to be measured, the sample is processed so that the cross-section of the particles is observable by STEM. At this time, 10 to 30 particles of secondary particles in which the diameter of the secondary particles is within ±5 μm with respect to the volume average particle size are arbitrarily selected from the particles of the observed plurality of positive electrode active material. The tungsten concentration ratio (maximum tungsten concentration/average tungsten concentration) is calculated for the cross-section of the particles of each positive electrode active material. Specifically, at the cross-section of each particle, the tungsten concentration is measured along the line drawn to the particle surface from the center of the particle by STEM-EDX line analysis to determine the ratio of the maximum tungsten concentration at the surface to the average tungsten concentration at a range of 3 μm from the particle surface.

It should be noted that the line segment for conducting STEM-EDX line analysis for each particle can be drawn radially from the center of the particle in which the center is a center of the minimum circumscribed circle adjacent to the cross-section of the particle.

The average value of the tungsten concentration ratio obtained for the particles of the plurality of the positive electrode active material to be evaluated can be used as the ratio of the tungsten concentration of the positive electrode active material.

When the ratio of the tungsten concentration of the positive electrode active material in the present embodiment is within the above-described range, the positive electrode active material may have excellent short-circuit resistance and output characteristics. Specifically, when the tungsten concentration ratio is set to be 25 or less, the thickness of the lithium tungstate layer as the coating is prevented from being excessively thick, and the interfacial resistance is suppressed. Therefore, the output characteristic can be increased. In addition, by adjusting the tungsten concentration ratio to or more, a sufficient lithium tungstate coating on the surface of the secondary particles of the lithium-nickel composite oxide can be formed, so that the resistance to short-circuits increases.

The crystalline phase of the lithium tungstate coating in the positive electrode active material of the present embodiment is not particularly limited, but is preferably at least one selected from, for example, $7Li_2WO_4 \cdot 4H_2O$, $Li_2WO_4$, and $Li_4WO_5$. The above-described compound can be preferably used as the crystalline phase of lithium tungstate, which is the coating, so that the short-circuit resistance and output characteristics can be particularly enhanced.

The positive electrode active material in the present embodiment preferably has a specific surface area measured by the BET method of 0.2 m²/g or more and 0.8 m²/g or less.

The specific surface area of the positive electrode active material of the present embodiment is within the above-described range, so that the output characteristics can be particularly increased.

Specifically, by adjusting the specific surface area to be 0.8 m²/g or less, the packing density can be increased and the energy density as the positive electrode active material can be increased when the positive electrode is prepared.

Further, since the specific surface area is set to be 0.2 m²/g or more, the contact area with the electrolyte can be increased, and the effect of the reduction of the positive electrode resistance by the lithium tungstate coating can be particularly exerted, so that the output characteristics can be particularly enhanced.

The positive electrode active material of the present embodiment preferably has a volume resistivity of $1.0 \times 10^2$ Ω·cm or more and $1.0 \times 10^4$ Ω·cm or less when the positive electrode active material is compressed to 3.2 g/cc, which is determined by a powder resistivity measurement. Normally, it is considered that the lower the resistivity of the positive electrode active material, the lower the resistivity in the electrochemical reaction is, for an excellent active material. However, when considering the short-circuit resistance, the generation of a sudden current during a short-circuit by suppressing the conductivity to a moderate degree can be suppressed. When the positive electrode of the non-aqueous electrolyte secondary battery is used, the positive electrode active material of the present embodiment can exert extremely high short-circuit resistance while maintaining particularly excellent output characteristics by adjusting the volume resistivity at powder resistivity measurement.

The volume resistivity determined by the powder resistivity measurement can be determined by a resistivity test method using the four-probe method in accordance with JIS K 7194:1994, for example, weighing the positive electrode active material in the range of 4.5 g to 5.5 g, followed by pressurizing the positive electrode active material to form a cylinder with a diameter of 20 mm of 3.2 g/cc, and measuring the volume resistivity under pressure.

The positive electrode active material of the present embodiment preferably has a volume average particle size (Mv) of 5 μm or more and 20 μm or less and more preferably 6 μm or more and 15 μm or less. When the volume average particle size (Mv) is within the above range, a positive electrode active material with particularly good output characteristics can be obtained.

Specifically, when a positive electrode is prepared, the packing density can be enhanced and the energy density as the positive electrode active material can be enhanced, by adjusting the volume average particle size to 5 μm or more. Further, since the specific surface area is sufficiently increased by adjusting the volume average particle size to be 20 μm or less, the positive electrode resistance is suppressed, and the output characteristics can be particularly improved.

The volume average particle size can be determined from the cumulative volume value measured by, for example, a laser light diffraction scattering particle size distributor.

[Method of Manufacturing Positive Electrode Active Materials for Non-Aqueous Electrolyte Secondary Battery]

Hereinafter, a configuration example of a method of manufacturing a positive electrode active material for a non-aqueous electrolyte secondary battery according to the present embodiment (hereinafter, also referred to as a "method of manufacturing a positive electrode active material") will be described. However, the method of manufacturing a positive electrode active material according to the present embodiment may be a manufacturing method in which the positive electrode active material described above is obtained. The method of manufacturing the positive electrode active material according to the present embodiment is not limited to the embodiments described below.

In addition, since the above-described positive electrode active material is obtained by the method of manufacturing the positive electrode active material according to the present embodiment, the description of some of the matters described above is omitted.

The method of manufacturing a positive electrode active material according to the present embodiment can include, for example, the following steps.

A process of preparing a raw material mixture in which a lithium-nickel composite oxide is mixed with an alkaline solution in which a tungsten compound is dissolved, and the raw material mixture is prepared by separating solid and liquid. A drying process to dry the raw material mixture.

Each process will be described below.

(1) Preparation of Raw Material Mixture

In the process of preparing the raw material mixture, as described above, a lithium-nickel composite oxide is mixed with an alkaline solution in which the tungsten compound is dissolved and solid-liquid separation is performed to prepare the raw material mixture.

The lithium-nickel composite oxide subjected to the raw material mixture preparation process preferably has a layered structure of hexagonal system, and has primary particles and secondary particles, in which the secondary particles are formed by aggregation of primary particles.

The method of manufacturing a lithium-nickel composite oxide used in the preparation of the raw material mixture is not particularly limited, and various methods can be adopted.

The lithium-nickel composite oxide can be prepared, for example, by the following procedure.

A nickel composite hydroxide obtained by coprecipitating a metal element other than lithium that constitutes a lithium-nickel composite oxide, or a nickel composite oxide obtained by further heat treatment of the nickel composite hydroxide, is mixed with a lithium compound. The resulting mixture can then be fired to obtain lithium-nickel composite oxide particles.

Although the lithium compound is not particularly limited, for example, one or more kinds selected from lithium carbonate, lithium hydroxide, or the like may be used.

A method of adding tungsten compounds includes a method of mixing an alkaline solution containing tungsten, compounds dissolved (hereinafter, also referred to as an "alkaline solution containing tungsten") with a lithium-, nickel composite oxide or a method of mixing a powder of tungsten compounds with a lithium-nickel composite oxide containing water. However, in the method of manufacturing the positive electrode active material in the present embodiment, the former method, is preferably adopted. This is because the tungsten compound can be permeated into the lithium-nickel composite oxide as an alkaline solution containing tungsten, thereby providing a high concentration and uniform dispersion of tungsten on the surface of the secondary particles of the lithium-nickel composite oxide.

Therefore, in the preparation of a raw material mixture of the method of manufacturing the positive electrode active material according to the present embodiment, it is preferable to mix the lithium-nickel composite oxide and the alkaline solution containing tungsten.

In the method of mixing the alkaline solution containing, tungsten, the content of tungsten in the raw material mixture obtained after solid-liquid separation and the content of tungsten in the obtained positive electrode active material are almost identical in the preparation process of the raw material mixture. Therefore, for the raw material mixture obtained after solid-liquid separation, the amount of tungsten added in the preparation process of the raw material mixture is preferably adjusted so that the number of tungsten atoms is 0.5% by atomic weight or more and 3.0% by atomic weight or less with respect to the total number of atoms of nickel, cobalt, and element M contained in the lithium-nickel composite oxide. The amount of tungsten added in the process of preparation process of the raw material mixture is more preferably 0.7% by atomic weight or more and 2.0% by atomic weight or less. For the raw material mixture, the number of tungsten atoms is set to 0.5% by atomic weight or more with respect to the sum of the number of atoms of nickel, cobalt, and element M contained in the lithium-nickel composite oxide, so that the output characteristics can be particularly enhanced and the short-circuit resistance can be sufficiently improved. In addition, for the raw material mixture, the number of tungsten atoms with respect to the total number of atoms of nickel, cobalt, and element M contained in the lithium-nickel composite oxide is preferably 3.0% by atomic weight or less, so that the proportion of lithium-nickel composite oxide in the positive electrode active material can be sufficiently increased and the charge-discharge capacity can be increased.

The method of dissolving the tungsten compound may be a conventional method of dissolving the powder, for example, by adding the tungsten compound while stirring the solution using a reactor with a stirrer. The tungsten compound is preferably completely dissolved in an alkaline solution due to the uniformity of the dispersion.

The tungsten compound to be added is not particularly limited if it is soluble in the alkaline solution, but it is preferable to use a tungsten compound which is readily soluble in alkali, such as tungsten oxide, lithium tungstate, ammonium tungstate, or the like.

As the alkali used in the alkaline solution, it is preferable to use a general alkali that does not contain impurities harmful to the positive electrode active material in order to obtain a high charge-discharge capacity.

One or more kinds of alkali selected from ammonia and lithium hydroxide, which does not have a risk of contaminating with impurities, may be preferably used as the alkaline solution. In particular, lithium hydroxide as the alkali may be preferably used from the viewpoint of not inhibiting lithium intercalation.

In addition to tungsten, the alkaline solution containing tungsten may also contain lithium by using an alkali containing lithium, for example, lithium hydroxide, as the alkali as described above. In this case, a ratio of Li/W, which is the ratio of the amount of substance in lithium (Li) relative to tungsten (W) in the alkaline solution containing tungsten, is preferably 1.0 or more and 4.0 or less.

In the raw material mixture formed in preparation process of the raw material mixture, lithium is also eluted and supplied from a lithium-nickel composite oxide. However, in preparing the alkaline solution containing tungsten, an alkali containing lithium is used, and the ratio of Li/W in the alkaline solution containing tungsten is set to the above-described range. Thus, a particularly sufficient amount of lithium to form lithium tungstate can be supplied.

In addition, the alkaline solution containing tungsten is preferably an aqueous solution.

It is preferred that the solvent is uniformly permeated throughout the particles of the lithium-nickel composite oxide in order to suppress unevenness in concentration and uniformly disperse the tungsten throughout the particles. However, using a solvent such as a highly volatile alcohol, the solvent may evaporate to prevent the tungsten from dispersing uniformly throughout the particles before the alkaline solution containing tungsten permeates the entire particle. Therefore, water is preferably used as the solvent, and the alkaline solution containing tungsten is preferably used as an aqueous solution.

The pH of the alkaline solution containing tungsten may be any pH at which the tungsten compound dissolves. The pH is not particularly limited, but is preferably 8 to 12. This is because, by adjusting the pH of the alkaline solution containing tungsten to 8 or higher, the amount of lithium elution from the lithium-nickel composite oxide can be suppressed, and the battery characteristics can be improved.

In addition, by adjusting the pH of the alkaline solution containing tungsten to 12 or less, excess alkali remains in the lithium-nickel composite oxide, and thus the battery characteristics can be enhanced.

The amount of the alkaline solution containing tungsten which is mixed with the lithium-nickel composite oxide is not particularly limited. The amount of liquid is preferably adjusted so that the amount of tungsten added is in the desired range and can be mixed by stirring or the like. For example, the amount of the alkaline solution containing tungsten for 100 g of lithium-nickel composite oxide is preferably 0.5 mL or more and 150 mL or less, more preferably 2 mL or more and 150 mL or less, and further preferably 3 mL or more and 100 mL or less.

The amount of the alkaline solution containing tungsten with respect to 100 g of the lithium-nickel composite oxide is adjusted to 0.5 mL or more, so that the amount of the alkaline solution containing tungsten is sufficient, and the tungsten is particularly uniformly dispersed on the surface of the secondary particles of the lithium-nickel composite oxide.

In addition, when the amount of the alkaline solution containing tungsten with respect to 100 g of the lithium-nickel composite oxide is adjusted to 150 mL or less, the amount of the alkaline solution containing tungsten can be prevented from being excessively large, and the mixed solution can be prevented from becoming a slurry. Accordingly, an elution of lithium contained in a layered lattice of the lithium-nickel composite oxide can be prevented and battery characteristics are improved.

As described below, after the lithium-nickel composite oxide and the alkaline solution are mixed, solid-liquid separation can be performed to facilitate drying process. However, if the amount of liquid component removed at this time is excessively large, the amount of tungsten added as an alkaline solution containing tungsten and the amount of tungsten in the positive electrode active material will vary greatly, and control of the amount of tungsten in the positive electrode active material may be complicated.

Meanwhile, by adjusting the amount of alkaline solution containing tungsten with respect to 100 g of lithium-nickel composite oxide to 0.5 mL or more and 150 mL or less, the variation in the amount of tungsten in the raw material mixture due to solid-liquid separation can be suppressed, and the resulting positive electrode active material can be used as the desired composition. In addition, an elution of lithium contained in a layered lattice of the lithium-nickel composite oxide can be suppressed, and tungsten can be uniformly dispersed on the surface of the secondary particles of lithium-nickel composite oxide.

The concentration of tungsten in the alkaline solution containing tungsten is not particularly limited. For example, when a predetermined amount of liquid is added to the lithium-nickel composite oxide, the amount of tungsten supplied is preferably adjusted to be within the range described above. For example, the concentration of tungsten in the alkaline solution containing tungsten is preferably 0.3 mol/L or more and 2 mol/L or less.

The concentration of tungsten in the alkaline solution containing tungsten can be sufficiently high by adjusting the concentration to 0.3 mol/L or more, and it is possible to prevent the amount of the alkaline solution containing tungsten, to be mixed with the lithium-nickel composite oxide, from becoming excessively high, and an elution of lithium due to slurryfication described above can be suppressed.

In addition, by adjusting the concentration of tungsten in the alkaline solution containing tungsten to 2 mol/L or less, it is possible to prevent the amount of the alkaline solution containing tungsten, to be mixed with the lithium-nickel composite oxide, from becoming excessively low, and the tungsten can be uniformly dispersed on the surface of the secondary particles of the lithium-nickel composite oxide.

In the preparation process of the raw material mixture, an alkaline solution containing tungsten may be added to and mixed with a lithium-nickel compound oxide.

When an alkaline solution containing tungsten is added and mixed, the alkaline solution containing tungsten is preferably liquid. In addition, the temperature of the mixture of the lithium-nickel composite oxide and the alkaline solution containing tungsten is preferably kept at 50° C. or less. This is because maintaining the temperature of the mixture at 50° C. or less prevents the drying of the alkaline solution containing tungsten from proceeding rapidly and allows the tungsten to be uniformly dispersed throughout the lithium-nickel composite oxide particles. In addition, by maintaining the temperature of the above-described mixture at 50° C. or less, a state such that liquid around the lithium-nickel composite oxide can be maintained, and an elution of lithium from the lithium-nickel composite oxide can be expected. Therefore, even when lithium is not contained in, for example, an alkaline solution containing tungsten, a lithium tungstate coating on the surface of the secondary particles of the lithium-cobalt composite oxide can be reliably formed.

After the lithium-nickel composite oxide is mixed with an alkaline solution containing tungsten, the resulting mixture can be separated into solid and liquid. The method of solid-liquid separation is not particularly limited, and conventional methods can be adopted. One or more types of methods, for example, a filter press, a centrifuge, a suction filter such as a Nutsche (a Buchner funnel), or the like, can be used for a solid-liquid separation.

The water content of the raw material mixture, which is a cake obtained after the solid-liquid separation, is preferably 5% or more and 15% or less based on mass ratio. If the water content is in the range described above, the alkaline solution containing tungsten can sufficiently permeate throughout the particle during drying, so that a tungsten coating film can be formed uniformly and at a high concentration on the surface of the secondary particles of lithium-nickel composite oxide. By reducing the water content to 15% or less, it is capable of suppressing the elution of excess lithium from the lithium-nickel composite oxide, thereby the battery capacity and output can be increased.

In addition, when the water content is 5% or more, a sufficient tungsten coating film is formed on the surface of the lithium-nickel composite oxide, and the short-circuits resistance can be particularly enhanced.

(2) Drying Process

The drying process is the process of drying the raw material mixture prepared in the preparation process of raw material mixture.

By drying the raw material mixture, a lithium tungstate is formed by tungsten obtained from the tungsten compound in the alkaline solution containing tungsten and lithium solved in the water content included in the raw material mixture. Then, a positive electrode active material having a compound containing tungsten and lithium, such as a lithium tungstate, on the surface of the secondary particles of the lithium-nickel composite oxide can be obtained.

The drying method is not particularly limited, but it is preferable that drying is performed without vibration in order to concentrate the tungsten component on the surface of the secondary particles of the lithium-nickel composite oxide. This is because the tungsten component permeates into the particles of lithium-nickel composite oxide when drying while vibrating with a vibration dryer or the like, and the tungsten concentration on the surface of the secondary particles may be reduced.

The drying is preferably performed by heat treatment under an oxygen atmosphere or a vacuum atmosphere at a temperature of 100° C. to 250° C.

The drying temperature is set to 100° C. or higher to sufficiently evaporate the water content in the raw material mixture, and a lithium tungstate can be sufficiently formed on the particle surface of the lithium-nickel composite oxide.

Further, setting the drying temperature of 250° C. or less enables use of a compact dryer, and the drying temperature is suitable for use on an industrial scale.

The atmosphere during drying is preferably a vacuum atmosphere or an oxidizing atmosphere such as an oxygen atmosphere in order to avoid the reaction between water content or carbonic acid in the atmosphere with the resulting positive electrode active material.

The drying time is preferably 0.5 hours or more at the maximum reaching temperature during drying in order to sufficiently evaporate water content of the raw material mixture to form sufficient lithium tungstate on the surface of the secondary particles of the lithium-nickel composite oxide.

In addition, the drying time is preferably 48 hours or less from the viewpoint of productivity.

[Non-Aqueous Electrolyte Secondary Battery]

The non-aqueous electrolyte secondary battery (hereinafter, also referred to as "secondary battery") according to the present embodiment can have a positive electrode that includes the aforementioned positive electrode active material.

Hereinafter, a configuration example of a secondary battery according to the present embodiment will be described for each component. The secondary battery in the present embodiment includes, for example, a positive electrode, a negative electrode, and a non-aqueous electrolyte, and is configured by the same components as a general lithium-ion secondary battery. It should be noted that the embodiments described below are merely exemplary, and the non-aqueous electrolyte secondary battery of the present embodiment can be implemented in various modified and improved forms based on the knowledge of a person skilled in the art, including the following embodiments. In addition, the secondary battery is not particularly limited with respect to uses thereof.

(Positive Electrode)

The positive electrode of the secondary battery in the present embodiment can include the positive electrode active material described above.

An example of a manufacturing method of the positive electrode will be described below. First, the aforementioned positive electrode active material (in powder form), a conductive material, and a binding agent (binder) can be mixed to form a positive electrode mixture. If necessary, activated carbon or a solvent for the purpose of adjustment of viscosity can be added to the positive electrode mixture, and followed by kneading to prepare a positive electrode mixture paste.

The mixing ratio of each material in the positive electrode mixture is a determinant of the performance of the lithium secondary battery. Therefore, the mixing ratio can be adjusted depending on the application. The mixing ratio of the materials may be the same as that of a known lithium secondary battery. For example, when the total mass of solids of the positive electrode mixture without solvent is 100% by mass, the positive electrode active material may contain 60% by mass or more and 95% by mass or less, the conductive material may contain 1% by mass or more and 20% by mass or less, and the binder may contain 1% by mass or more and 20% by mass or less.

The resulting positive electrode mixture paste is coated, for example, to a surface of an aluminum foil current collector, dried to evaporate solvent, and a sheet-like positive electrode is prepared. If necessary, pressure may be applied by roll press or the like to increase electrode density. The sheet-like positive electrode obtained in this way can be cut to a suitable size depending on a desired battery to be used. Accordingly, the sheet-like positive electrode can be used for producing a battery.

As the conductive material, for example, graphite (natural graphite, artificial graphite, expanded graphite, and the like) or carbon black-based material such as acetylene black or Ketchen Black (trademark), or the like can be used.

The binder serves to anchor the active material particles. Examples of binder include polyvinylidene fluoride (PVDF), polytetrafluoroethylene (PTFE), fluorine rubber, ethylene propylene diene rubber, styrene butadiene, cellulose-based resins, polyacrylic acid, or the like.

If necessary, a solvent dispersed the positive electrode active material, the conductive material, and the activated carbon and dissolved the binding agent is added to the positive electrode mixture. For example, an organic solvent such as N-methyl-2-pyrrolidone may be used as the solvent. An activated carbon can also be added to the positive electrode mixture to increase the electrical double layer capacity.

The method of manufacturing positive electrode is not limited to the example described above, but the positive electrode may be manufactured by other methods. For example, the positive electrode mixture may be press molded and then dried under vacuum.

(Negative Electrode)

A negative electrode may be a lithium metal, a lithium alloy, or the like. The negative electrode may be formed by mixing a negative electrode active material capable of intercalating and de-intercalating lithium ions with a binder agent, and further adding an appropriate solvent to the mixture so as to form a paste-like negative electrode mixture, then, the paste-like negative electrode mixture is coated to the surface of a metal foil current collector such as copper, and the resultant is subjected to be dried. The negative electrode may be compressed to increase the electrode density as needed.

As for the negative electrode active material, for example, an organic compound fired body such as natural graphite, artificial graphite and phenolic resins and the like, and powders of carbon materials such as coke can be used. In this case, a fluorine-containing resin such as PVDF may be used as the negative electrode binder in the same manner as the positive electrode. An organic solvent such as N-methyl-2-pyrrolidone may be used as the solvent for dispersing the active material and the binding agent.

(Separator)

A separator can be sandwiched between the positive and negative electrodes as needed. The separator separates the positive electrode from the negative electrode and retains the electrolyte. The separator is a thin film which is well known in the art, such as polyethylene or polypropylene and has a number of microscopic pores.

(Non-Aqueous Electrolyte)

Examples of non-aqueous electrolyte include a non-aqueous electrolytic solution.

As the non-aqueous electrolytic solution, for example, the solution in which a lithium salt as a supporting salt is dissolved in an organic solvent, may be used. As the non-aqueous electrolytic solution, the solution in which a lithium salt is dissolved in an ionic liquid, may be used. The ionic liquid is a salt that includes cations and anions other than lithium ions and is the liquid even at room temperature.

As the organic solvent, one selected from a group consisting of cyclic carbonates such as ethylene carbonate, propylene carbonate, butylene carbonate, and trifluoropropylene carbonate; a chain-like carbonate such as diethyl carbonate, dimethyl carbonate, ethyl methyl carbonate, and dipropyl carbonate; an ether compound such as tetrahydrofuran, 2-methyl tetrahydrofuran, and dimethoxyethane; a sulfur compound such as ethyl methyl sulfone and butane sultone; a phosphorus compound such as triethyl phosphate and trioctyl phosphate; and the like may be used alone. The organic solvent may be used by mixing two or more kinds.

As the supporting salt, $LiPF_6$, $LiBF_4$, $LiClO_4$, $LiAsF_6$, $LiN(CF_3SO_2)_2$, and their composite salts may be used. In addition, the non-aqueous electrolytic solution may contain radical scavengers, surfactants, flame retardants, and the like.

As the non-aqueous electrolyte, a solid electrolyte may be used. Solid electrolytes have the property to withstand high voltages. Examples of the solid electrolyte include inorganic solid electrolyte and organic solid electrolyte.

Examples of the inorganic solid electrolyte include an oxide-based solid electrolyte and a sulfide-based solid electrolyte.

The oxide-based solid electrolyte is not particularly limited. For example, the oxide-based solid electrolyte may preferably contain oxygen (O) and may preferably exhibit a lithium ion conductivity and an electron insulating property. Examples of the oxide-based solid electrolyte include lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ (0≤X≤1), $Li_{1+X}Al_XGe_{2-X}(PO_4)_3$ (0≤X≤1), $LiTi_2(PO_4)_3$, $Li_{3X}La_{2/3-X}TiO_3$ (0≤X≤⅔), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, the sulfide-based solid electrolyte may preferably contain sulfur (S) and may preferably exhibit a lithium ion conductivity and an electron insulating property. Examples of the sulfide-based solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$, and the like.

An inorganic solid electrolyte other than the above may be used. For example, $Li_3N$, $LiI$, $Li_3N$—$LiI$—$LiOH$, or the like may be used.

The organic solid electrolyte is not particularly limited in the case of a polymer compound exhibiting ionic conductivity. For example, polyethylene oxide, polypropylene oxide, copolymers thereof, and the like may be used. The organic solid electrolyte may also contain a supporting salt (lithium salt).

(Shape and Configuration of the Secondary Battery)

The non-aqueous electrolyte secondary battery of the present embodiment described above can be in a variety of shapes, such as cylindrical or laminated shape. In any form, when the secondary battery according to the present embodiment uses a non-aqueous electrolytic solution as the non-aqueous electrolyte, the positive electrode and the negative electrode can be laminated via a separator to form an electrode body. The obtained electrode body is impregnated with the non-aqueous electrolytic solution. Then, between the positive electrode collector and the positive electrode terminal leading to the outside and between the negative electrode collector and the negative electrode terminal leading to the outside is connected with a collector lead or the like, and sealed in a battery case.

As described above, the secondary battery according to the present embodiment is not limited to an embodiment using a non-aqueous electrolytic solution as a non-aqueous electrolyte. The secondary battery of the present embodiment may be, for example, a secondary battery using a solid non-aqueous electrolyte, that is, an all-solid-state battery. In the case of all-solid-state battery, the configuration other than the positive electrode active material can be changed as necessary.

The secondary battery of the present embodiment is suitable for power supply for compact portable electronic devices (such as notebook personal computers and mobile phone terminals) that require high capacity at all times, and for power supply for electric vehicles that require high output.

In addition, the secondary battery according to the present embodiment has excellent short-circuit resistance, and the secondary battery can be miniaturized and has high output. Therefore, the secondary battery according to the present embodiment is suitable as a power supply for an electric vehicle that is constrained by the mounting space. The secondary battery according to the present embodiment can be used not only as a power supply for an electric vehicle driven by purely electrical energy, but also as a power supply for a so-called hybrid vehicle combined with a combustion engine such as a gasoline engine or a diesel engine.

EXAMPLE

Hereinafter, the present invention will be described in detail with reference to examples. However, the invention is not limited to the following examples.

First, a method of evaluating a positive electrode active material manufactured by the following Examples and Comparative Examples will be described.

(1) Analysis of the Composition

The composition of the positive electrode active material obtained in each of the following Examples and Comparative Examples was evaluated by an ICP emission spectroscopy using an ICP emission spectroscopic analyzer (manufactured by Shimadzu Corporation, Model: ICPS8100).

(2) Ratio of Tungsten Concentration (Maximum Tungsten Concentration/Average Tungsten Concentration)

With regard to the positive electrode active material obtained in the following Examples and Comparative Examples, a plurality of particles of the positive electrode active material were embedded in the resin to enable cross-sectional observation of the particles by focused ion beam processing.

The prepared sample was observed by a STEM-EDX (manufactured by Hitachi High-Technologies, Inc., Model: HD2300A) and 20 secondary particles were selected arbitrarily from a plurality of secondary particles contained in the positive electrode active material. At this time, secondary particles with a diameter within ±5 μm with respect to the volume average particle size were selected.

In a cross-section of individual secondary particles in the selected positive electrode active material, component analysis was performed by a STEM-EDX line analysis along the line drawn from the center of the particle to the particle surface, and tungsten concentration was measured. In the cross section of the particle at the individual secondary particle cross-sections, a center of the smallest circumscribed circle is taken as the center of the particle, and a line segment for STEM-EDX line analysis was set along a radial direction of the circumferential circle from the center of the particle.

Then, a ratio of a maximum tungsten concentration at the surface and an average tungsten concentration in the range of 3 μm from the particle surface (maximum tungsten concentration/average tungsten concentration) was calculated. Next, the average value of the ratio of tungsten concentration in the particles of each positive electrode active material evaluated was calculated as the ratio of tungsten concentration of the positive electrode active material.

Table 1 illustrates the "ratio of tungsten concentration".

(Qualitative Evaluation of Crystal Structures)

In the positive electrode active material obtained in each of the following Examples and Comparison Examples, a crystal structure of the obtained lithium-nickel composite oxide of the positive electrode active material and the crystal structure of the coating film were evaluated from an XRD diffraction pattern using Cu-Kα rays by an XRD diffraction device (manufactured by Malvern PANalytical Ltd., X'Pert PRO).

(Specific Surface Area)

The positive electrode active materials obtained in the following Examples and Comparison examples were measured by a BET method by nitrogen adsorption using a specific surface area and pore distribution measuring device (manufactured by Mountech Co., Ltd., Macsorb HM model-1200 series).

(Volume Average Particle Size Mv)

The positive electrode active material obtained in each of the following Examples and Comparison Examples was evaluated in terms of the volume average particle size using a laser diffraction/scattering particle size distribution analyzer (manufactured by Nikkiso Co., Ltd., Microtrack HRA).

(Volume Resistivity at Powder Compression)

The positive electrode active material obtained in each of the following Examples and Comparison Examples was compressed to 3.2 g/cc, and the volume resistivity was measured by a powder resistivity measurement device (manufactured by former Mitsubishi Chemical Analytech Co., Ltd., Loresta).

(Manufacture and Evaluation of Battery)

A 2032-model coin-type battery 11 illustrated in FIG. 1 (hereinafter referred to as the "coin-type battery") was used for an evaluation of the positive electrode active material obtained in the following Examples and Comparative Examples.

Figure 1:
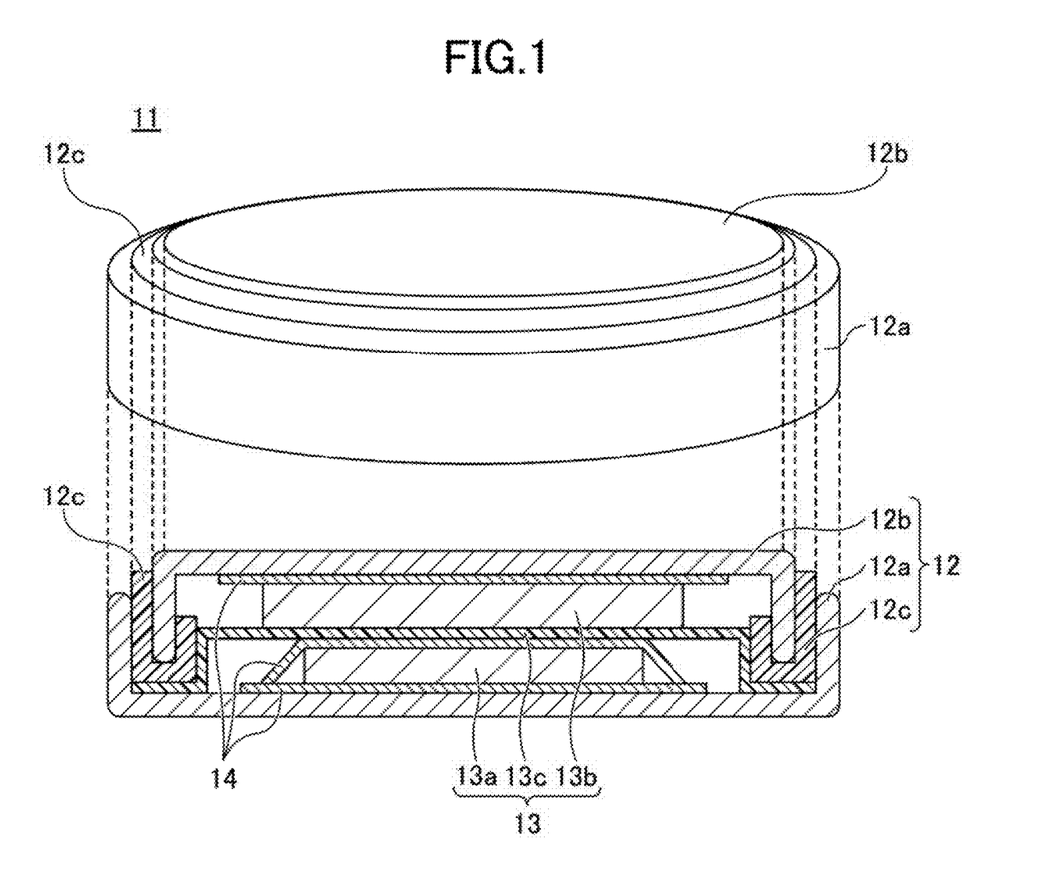
FIG. 1 is a schematic cross-sectional view of a coin-type battery used for battery evaluation.

As illustrated in FIG. 1, the coin-type battery 11 is configured by a case 12 and an electrode 13 contained within the case 12.

The case 12 has a positive electrode can 12a that is hollowed out and has one end open and a negative electrode can 12b that is disposed in the opening of the positive electrode can 12a. When the negative electrode can 12b is disposed at the opening of the positive electrode can 12a, a space to accommodate the electrode 13 is formed between the negative electrode can 12b and the positive electrode can 12a.

The electrode 13 consists of a positive electrode 13a, a separator 13c, and a negative electrode 13b and is laminated in this order. The electrode 13 is housed in, the case 12 so that the positive electrode 13a contacts the inner surface of the positive electrode can 12a via a current collector 14 and the negative electrode 13b contacts the inner surface of the negative electrode can 12b via a current collector 14. The current collector 14 is also disposed between the positive electrode 13a and the separator 13c.

The case 12 includes a gasket 12c through which the relative movement is fixed so that the positive electrode can 12a and the negative electrode can 12b remain non-contacting. The gasket 12c also has a function of sealing the gap between the positive electrode can 12a and the negative electrode can 12b and air-tightly and liquid-tightly seals the inside and outside of the case 12.

The coin-type battery 11 illustrated in FIG. 1 was prepared as follows.

First, 52.5 mg of the positive electrode active material, 15 mg of acetylene black, and 7.5 mg of polytetrafluoroethylene (PTFE) resin were mixed, and press-molded at a pressure of 100 MPa to a diameter of 11 mm and a thickness of 100 μm to prepare the positive electrode 13a. The prepared positive electrode 13a was dried in a vacuum dryer at 120° C. for 12 hours.

The positive electrode 13a, the negative electrode 13b, the separator 13c, and an electrolyte solution were used to prepare the coin-type battery 11 described above in a glove box in an Ar atmosphere in which the dew point was controlled at −80° C.

The negative electrode 13b used was a negative electrode sheet which was cut out into a disk with a diameter of 14 mm in which a mixture of graphite powder having an average particle size of about 20 μm and polyvinylidene fluoride was coated on a copper foil. A polyethylene porous membrane with a thickness of 25 μm was used for the separator 13c. For the electrolyte solution, an equal volume mixture of ethylene carbonate (EC) and diethyl carbonate (DEC) containing 1 M of $LiClO_4$ as a supporting electrolyte (supporting salt) (manufactured by Tomiyama Pure Chemical Industries, LTD.) was used.

An initial discharge capacity and a positive electrode resistance that show the performance of the manufactured coin-type battery 11 were evaluated as follows.

In regards to an initial discharge capacity, the coin-type battery 11 was left for about 24 hours after the coin-type battery 11 was manufactured. After an open-circuit voltage (OCV) was stabilized, a current density relative to the positive electrode was set to 0.1 mA/cm$^2$, and the battery was charged to be a cut-off voltage of 4.3 V. After a pause of one hour, the battery was discharged to be the cut-off voltage of 3.0 V, and the discharged capacity was considered as the initial discharge capacity.

Figure 2A:
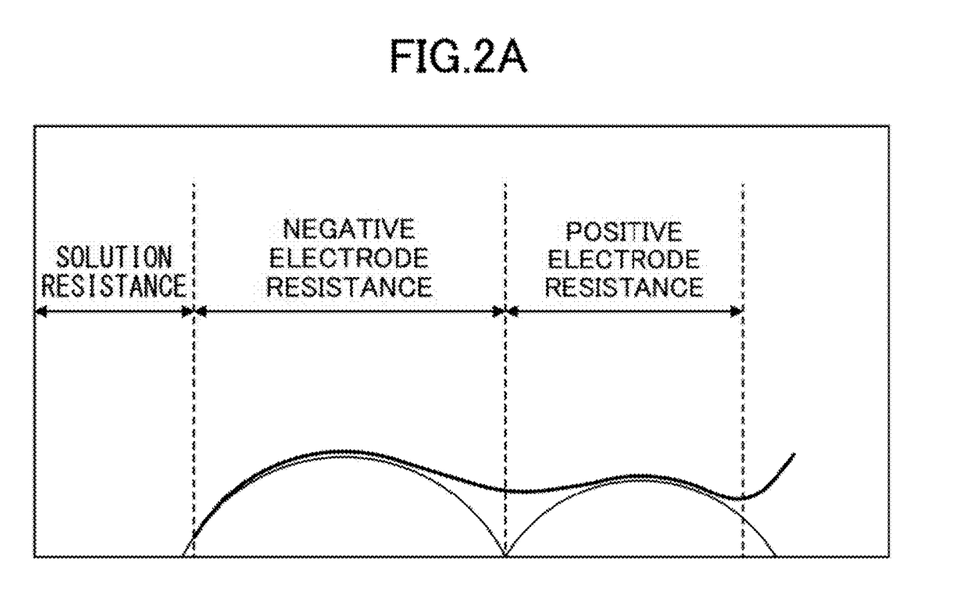
FIG. 2A is a measurement example of impedance evaluation.
Figure 2B:
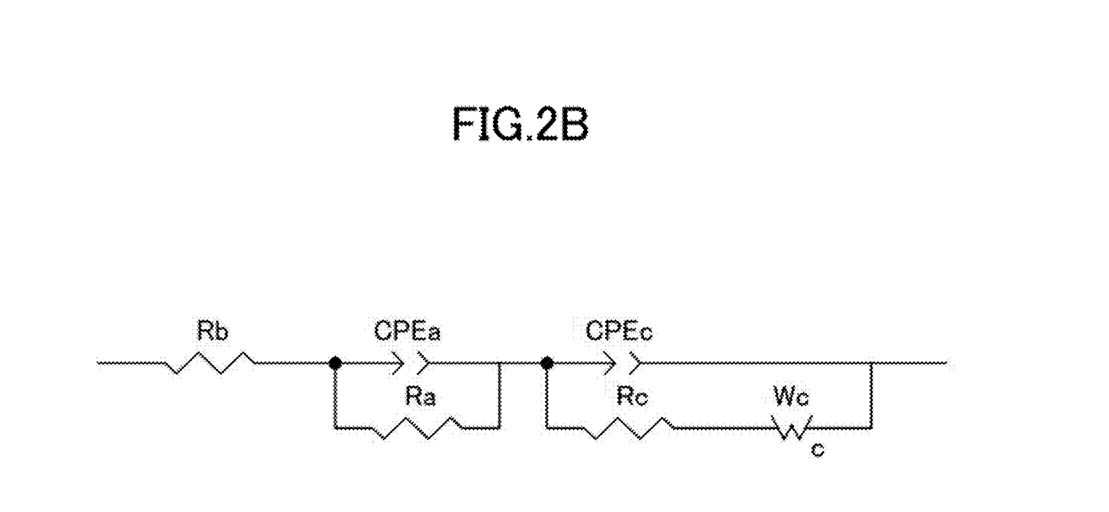
FIG. 2B is a schematic illustration of an equivalent circuit used in an analysis of impedance evaluation.

The positive electrode resistance was also measured by an AC impedance method using a frequency response analyzer and Potentiostat/Galvanostat (manufactured by Solartron Analytical, 1255B) by charging the coin-type battery 11 at a charge potential of 4.1 V to obtain the Nyquist plot illustrated in FIG. 2A. The Nyquist plot is expressed as the sum of characteristic curves such as the solution resistance, the negative electrode resistance and its capacitance, the positive electrode resistance and its capacitance. The fitting calculation was performed using the equivalent circuit illustrated in FIG. 2B based on the Nyquist plot, and the value of the positive electrode resistance was calculated.

Example 1

As a base material, lithium-nickel composite oxide particles represented by $Li_{1.01}Ni_{0.80}Co_{0.10}Mn_{0.10}O_2$ obtained by a known technique of mixing and firing a composite oxide having Ni as the main component with lithium hydroxide were used.

An alkaline solution containing tungsten was adjusted to have a tungsten concentration of 0.86 mol/L, and pH of 8.4 at 25° C., so that the ratio Li/W, that is, the ratio of lithium (Li) to the content of tungsten (W), was 2. The 150 ml of alkaline solution containing tungsten was added to a 150 g base material and stirred for 10 minutes.

In preparing the alkaline solution containing tungsten, lithium hydroxide was used as the alkali, tungsten trioxide as the tungsten compound, and water as the solvent.

After stirring, solid and liquid was separated by filtration using a Nutsche (Buchner funnel). The water content of the raw material mixture in the form of cake after solid-liquid separation was 9.5% (mass ratio) (preparation process of raw material mixture).

The resulting raw material mixture was placed in a SUS container, warmed to 100° C. in a vacuum dryer for 12 hours, warmed to 190° C. and then allowed to stand and dry for 10 hours, followed by cooling in a vacuum dryer (drying process).

Finally, the resulting mixture was crushed by sieving through a 38 μm screen, and the positive electrode active material in which the surface of secondary particles of lithium-nickel composite oxide is coated with lithium tungstate, was obtained.

The composition of the resulting positive electrode active material was analyzed by an ICP method, and it was confirmed that a molar ratio of Li:Ni:Co:Mn was 1.01:0.80:0.10:0.10, and a tungsten content was 1.0% by atomic weight relative to the total amount of substance in Ni, Co, and Mn.

Accordingly, it was confirmed that a ratio of amount of substance in lithium (Li), nickel (Ni), cobalt (Co), manganese (Mn), and tungsten (W), included in the resulting positive electrode active material was Li:Ni:Co:Mn:W=1.01:0.80:0.10:0.10:0.01.

In addition, by the observation using a scanning electron microscope (SEM) (manufactured by Japan Electronic, Model: JSM-7001F), it was confirmed that the lithium-nickel composite oxide in the positive electrode active material included the secondary particles formed by aggregation of the primary particles.

The resulting positive electrode active material had a volume average particle size Mv of 10.4 μm in a laser diffraction scattering method. In addition, a specific surface area of the resulting positive electrode active material was 0.30 m²/g by a BET method.

From an XRD diffraction pattern, it was confirmed that lithium-nickel composite oxide contained in the resulting positive electrode active material had a layered structure of hexagonal system. In addition, it was confirmed that a crystalline phase of the coating of lithium tungstate coated on the surface of the secondary particles of lithium-nickel composite oxide was $7Li_2WO_4 \cdot 4H_2O$.

A tungsten concentration in the cross-section of the particles of the resulting positive electrode active material was measured by a STEM-EDX line analysis to calculate a ratio of tungsten concentration. As a result, the ratio of tungsten concentration, which is the ratio of a maximum tungsten concentration to an average tungsten concentration in the cross-section of the particles of the resulting positive electrode active material, was 17.

A compressive volume resistivity, which was a volume resistivity when the resulting positive electrode active material was compressed to 3.2 g/cc, was measured using a powder resistivity measurement device (manufactured by Mitsubishi Chemical Analytech Co., Ltd., Loresta) and was $6.7 \times 10^3$ Ω·cm.

Battery characteristics of the coin-type battery 11 illustrated in FIG. 1 having a positive electrode prepared using the resulting positive electrode active material were evaluated. The initial discharge capacity was 185.8 mAh/g and the positive electrode resistance was 2.2Ω.

Hereinafter, for the Examples and the Comparative Examples, only the materials and conditions that were modified from Example 1 above are shown. The evaluation results of these Examples and Comparative Examples are shown in Table 1.

Example 2

A positive electrode active material was obtained and evaluated in the same manner as Example 1 except that a lithium-nickel composite oxide having a composition of $Li_{1.03}Ni_{0.70}Co_{0.15}Mn_{0.15}O_2$ was used as a base material. Evaluation results are shown in Table 1.

The composition of the resulting positive electrode active material was analyzed by the ICP method, and it was confirmed that the molar ratio of Li:Ni:Co:Mn was 1.03:0.70:0.15:0.15 and the tungsten content was 0.9% by atomic weight relative to the total amount of substance in Ni, Co, and Mn.

Accordingly, it was confirmed that the ratio of amount of substance in lithium (Li), nickel (Ni), cobalt (Co), manganese (Mn), and tungsten (W) included in the resulting positive electrode active material was Li:Ni:Co:Mn:W=1.03:0.70:0.15:0.15:0.009.

By the observation using the scanning electron microscope (SEM), it was confirmed that the lithium-nickel composite oxide in the positive electrode active material included the secondary particles formed by aggregation of the primary particles.

From the XRD diffraction pattern, it was confirmed that lithium-nickel composite oxide contained in the resulting positive electrode active material had a layered structure of hexagonal system.

Example 3

A positive electrode active material was obtained and evaluated in the same manner as Example 1 except that the composition of the base material was changed to Li$_{1.01}$Ni$_{0.82}$Co$_{0.15}$Al$_{0.03}$O$_2$. Evaluation results are shown in Table 1.

The composition of the resulting positive electrode active material was analyzed by the ICP method, and it was confirmed that the molar ratio of Li:Ni:Co:Al was 1.01:0.82:0.15:0.03, and the tungsten content was 1.1% by atomic weight relative to the total amount of substance in Ni, Co, and Al.

Accordingly, it was confirmed that the ratio of amount of substance in lithium (Li), nickel (Ni), cobalt (Co), aluminum (Al), and tungsten (W) included in the resulting positive electrode active material was Li:Ni:Co:Al:W=1.01:0.82:0.15:0.03:0.011.

By the observation using the scanning electron microscope (SEM), it was confirmed that the lithium-nickel composite oxide in the positive electrode active material included the secondary particles formed by aggregation of the primary particles.

From the XRD diffraction pattern, it was confirmed that lithium-nickel composite oxide contained in the resulting positive electrode active material had a layered structure of hexagonal system.

Example 4

The positive electrode active material was obtained and evaluated in the same manner as Example 1 except that the composition of the base material was changed to Li$_{1.00}$Ni$_{0.88}$Co$_{0.09}$Al$_{0.03}$O$_2$. Evaluation results are shown in Table 1.

The composition of the resulting positive electrode active material was analyzed by the ICP method, and it was confirmed that the molar ratio of Li:Ni:Co:Al was 1.00:0.88:0.09:0.03, and the tungsten content was 1.0% by atomic weight relative to the total amount of substance in Ni, Co, and Al.

Accordingly, it was confirmed that the ratio of amount of substance in lithium (Li), nickel (Ni), cobalt (Co), aluminum (Al), and tungsten (W) included in the resulting positive electrode active material was Li:Ni:Co:Al:W=1.00:0.88:0.09:0.03:0.01.

By the observation using the scanning electron microscope (SEM), it was confirmed that the lithium-nickel composite oxide in the positive electrode active material included the secondary particles formed by aggregation of the primary particles.

From the XRD diffraction pattern, it was confirmed that lithium-nickel composite oxide contained in the resulting positive electrode active material had a layered structure of hexagonal system.

Comparative Example 1

The positive electrode active material was obtained and evaluated in the same manner as Example 4, except that the alkaline solution containing tungsten was not used and pure water was used instead for washing. Evaluation results are shown in Table 1.

The composition of the resulting positive electrode active material was analyzed by the ICP method, and it was confirmed that the molar ratio of Li:Ni:Co:Al was 0.98:0.88:0.09:0.03.

By the observation using the scanning electron microscope (SEM), it was confirmed that the lithium-nickel composite oxide in the positive electrode active material included the secondary particles formed by aggregation of the primary particles.

From the XRD diffraction pattern, it was confirmed that lithium-nickel composite oxide contained in the resulting positive electrode active material had a layered structure of hexagonal system.

Comparative Example 2

The positive electrode active material was obtained and evaluated in the same manner as Example 4 except that the tungsten concentration of the alkaline solution containing tungsten was 0.28 mol/L. Evaluation results are shown in Table 1.

The composition of the resulting positive electrode active material was analyzed by the ICP method, and it was confirmed that the molar ratio of Li:Ni:Co:Al was 1.00:0.88:0.09:0.03, and the tungsten content was 0.3% by atomic weight relative to the total amount of substance in Ni, Co, and Al.

Accordingly, it was confirmed that the ratio of amount of substance in lithium (Li), nickel (Ni), cobalt (Co), aluminum (Al), and tungsten (W) included in the resulting positive electrode active material was Li:Ni:Co:Al:W=1.00:0.88:0.09:0.03:0.003.

By the observation using the scanning electron microscope (SEM), it was confirmed that the lithium-nickel composite oxide in the positive electrode active material included the secondary particles formed by aggregation of the primary particles.

From the XRD diffraction pattern, it was confirmed that lithium-nickel composite oxide contained in the resulting positive electrode active material had a layered structure of hexagonal system.

Comparative Example 3

The positive electrode active material was obtained and evaluated in the same manner as Example 4 except that the tungsten concentration of the alkaline solution containing tungsten was 4.5 mol/L. Evaluation results are shown in Table 1.

The composition of the resulting positive electrode active material was analyzed by the ICP method, and it was confirmed that the molar ratio of Li:Ni:Co:Al was 1.01:0.88:0.09:0.03, and the tungsten content was 5.6% by atomic weight relative to the total amount of substance in Ni, Co, and Al.

Accordingly, it was confirmed that the ratio of amount of substance in lithium (Li), nickel (Ni), cobalt (Co), aluminum (Al), and tungsten (W) included in the resulting positive electrode active material was Li:Ni:Co:Al:W=1.01:0.88:0.09:0.03:0.056.

By the observation using the scanning electron microscope (SEM), it was confirmed that the lithium-nickel composite oxide in the positive electrode active material included the secondary particles formed by aggregation of the primary particles.

From the XRD diffraction pattern, it was confirmed that lithium-nickel composite oxide contained in the resulting positive electrode active material had a layered structure of hexagonal system.

TABLE 1

| | Composition of positive electrode active material [molar ratio] | | | | | W/Ni + Co + element M [at %] | Tungsten concentration ratio | Crystalline phrase of lithium tungstate | Specific surface area [m²/g] | Volume average particle size Mv [μm] | Volume resistivity at powder compression [Ω · cm] | Battery characteristics | |
|---|---|---|---|---|---|---|---|---|---|---|---|---|---|
| | Li | Ni | Co | Mn | Al | | | | | | | Initial discharge capacity [mAh/g] | Positive electrode resistivity [Ω] |
| Example 1 | 1.01 | 0.80 | 0.10 | 0.10 | — | 1.0 | 17 | 7Li₂WO₄•4H₂O | 0.30 | 10.4 | $6.7 \times 10^3$ | 185.8 | 2.2 |
| Example 2 | 1.03 | 0.70 | 0.15 | 0.15 | — | 0.9 | 12 | 7Li₂WO₄•4H₂O | 0.33 | 12.8 | $1.3 \times 10^3$ | 184.4 | 1.5 |
| Example 3 | 1.01 | 0.82 | 0.15 | — | 0.03 | 1.1 | 8 | 7Li₂WO₄•4H₂O | 0.31 | 12.8 | $3.2 \times 10^3$ | 188.4 | 1.8 |
| Example 4 | 1.00 | 0.88 | 0.09 | — | 0.03 | 1.0 | 13 | 7Li₂WO₄•4H₂O | 0.31 | 12.6 | $1.8 \times 10^2$ | 196.9 | 2.0 |
| Comparative Example 1 | 0.98 | 0.88 | 0.09 | — | 0.03 | — | — | — | 1.00 | 12.7 | $1.3 \times 10^1$ | 215.7 | 3.5 |
| Comparative Example 2 | 1.00 | 0.88 | 0.09 | — | 0.03 | 0.3 | 2 | 7Li₂WO₄•4H₂O | 0.45 | 12.9 | $2.5 \times 10^1$ | 197.5 | 1.8 |
| Comparative Example 3 | 1.01 | 0.88 | 0.09 | — | 0.03 | 5.6 | 29 | 7Li₂WO₄•4H₂O | 0.63 | 13.5 | $4.0 \times 10^4$ | 175.4 | 6.3 |

As can be seen from Table 1, unlike Comparative Examples 1 to 3, the positive electrode active material of Examples 1 to 4 has a high-volume resistivity at powder resistivity and a low positive electrode resistance. Therefore, when the resulting positive electrode active materials in Examples 1 to 4 were used for a secondary battery, the battery was compatible with both the short-circuit resistance and the output characteristics.

Figure 3:
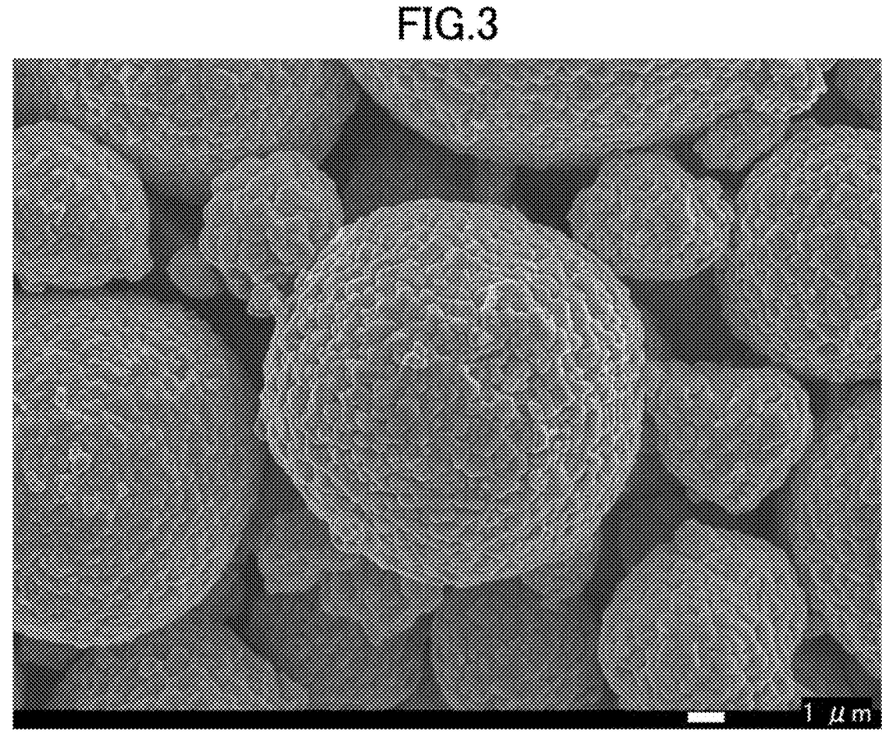
FIG. 3 is an SEM photograph of a positive electrode active material obtained in Example 1.

FIG. 3 indicates an example of the SEM observation results of the positive electrode active material obtained in Example 1. It was confirmed that the lithium-nickel composite oxide in the positive electrode active material included the secondary particles formed by aggregation of the primary particles.

Figure 4A:
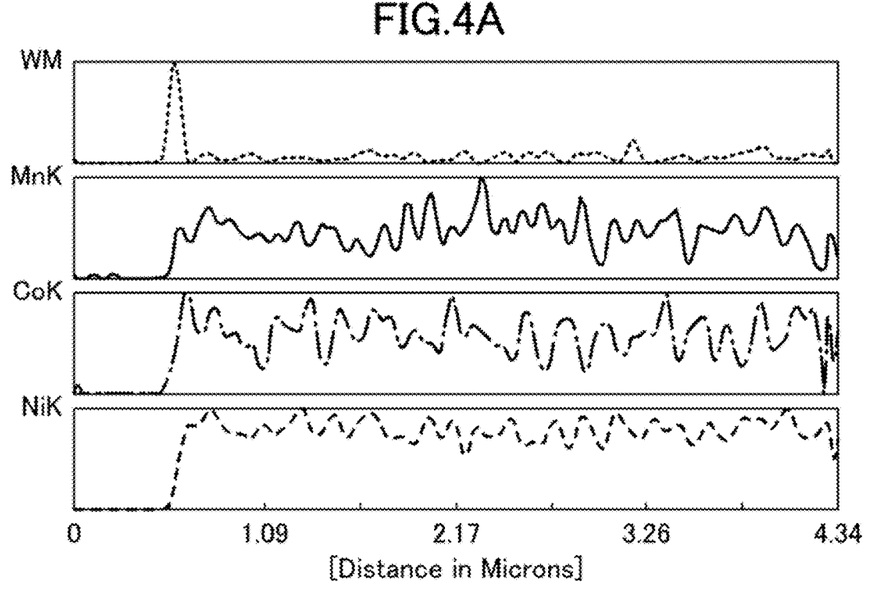
FIG. 4A is of a result of STEM-EDX line analysis of the positive electrode active material obtained in Example 1.
Figure 4B:
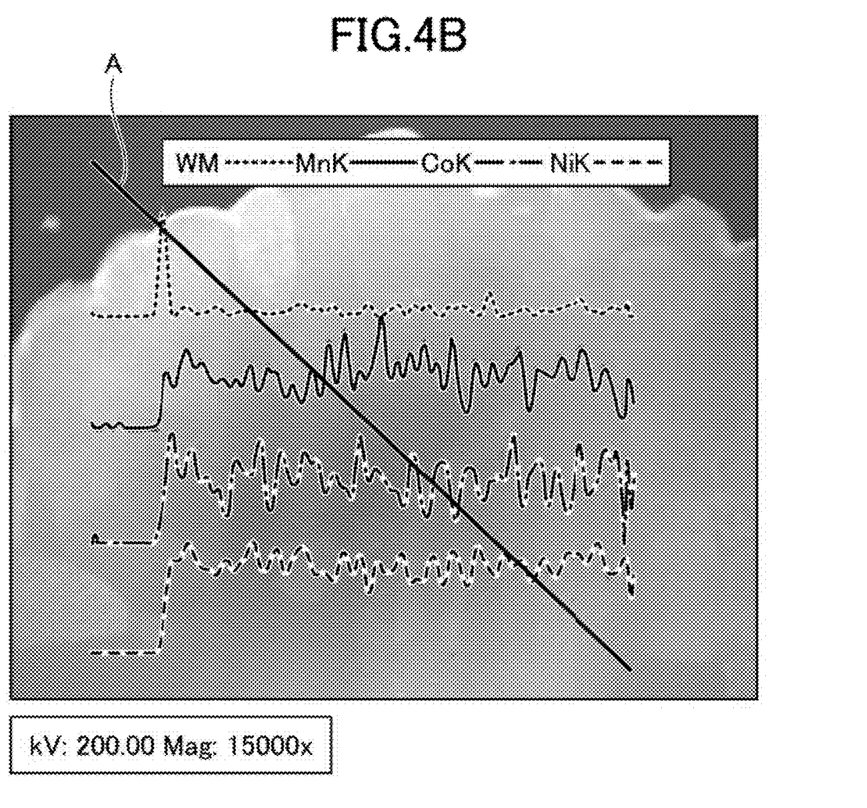
FIG. 4B is of a result of STEM-EDX line analysis of the positive electrode active material obtained in Example 1.

In addition, an example of the STEM-EDX results of the resulting positive electrode active material obtained in Example 1 is shown in FIGS. 4A and 4B. In FIG. 4B, a line segment A is a line analyzed by STEM-EDX, and the intensity distribution of tungsten (W), manganese (Mn), cobalt (Co), and nickel (Ni) analyzed along the line segment A is shown. The coordinates of the x-axis in the left and right directions in the figure are shown so that the line segment A and the intensity distribution of each element are consistent. The intensity distribution of "WM" is shown with tungsten, "MnK" is shown with manganese, "CoK" is shown with cobalt, and "NiK" is shown with nickel.

FIG. 4A indicates only the intensity distribution of each element shown in FIG. 4B separately for each element.

From the results shown in FIGS. 4A and 4B, the peak of tungsten can be observed on the particle surface of the positive electrode active material, indicating that tungsten is concentrated on the surface of the secondary particles (surface layer) of the lithium-nickel composite oxide. In other words, it was confirmed that a coating film containing tungsten was formed on the surface of the secondary particles of the lithium-nickel composite oxide. In conjunction with the results of the aforementioned XRD diffraction pattern, it was confirmed that a lithium tungstate coating film was formed. Although examples of Example 1 have been described here, from the results of STEM-EDX and XRD diffraction patterns in Examples 2 to 4, it has been confirmed that a coating film containing tungsten is formed on the surface of the secondary particles of lithium-nickel composite oxide.

In the positive electrode active material obtained in Comparative Example 1, the coating film of lithium tungstate was not formed on the surface of the secondary particles, so that the volume resistivity during powder compression was significantly low and the positive electrode resistance was also high. Therefore, it was confirmed that it is difficult to meet the requirements for high short-circuit resistance and high output characteristics.

The positive electrode active material obtained in Comparative Example 2 had a low tungsten content and an insufficient coating film of lithium tungstate on the surface of the secondary particles of lithium-nickel composite oxide. Therefore, it was confirmed that the volume resistivity at powder compression was low and insufficient to meet the requirement of the short-circuit resistance.

The positive electrode active material obtained in Comparative Example 3 had an excessively high content of tungsten and an excessive formation of compounds containing lithium, tungsten, and lithium tungstate on the surface of the secondary particles of the lithium-nickel composite oxide. Therefore, the positive electrode resistance was high and the discharge capacity was low. Therefore, it was confirmed that the short-circuit resistance was excellent, but the output characteristics were inferior. Therefore, the positive electrode active material of Comparative Example 3 did not meet the requirements for high capacity and high output characteristics.

Thus, although the positive electrode active material for the non-aqueous electrolyte secondary battery and the non-aqueous electrolyte secondary battery have been described in the embodiments and the examples, or the like, the present invention is not limited to the above-described embodiments and the examples. Various modifications and variations are possible within the scope of the invention as defined in the claims.

The present application is based on and claims priority to Patent Application No. 2018-105615, filed on May 31, 2018 with the Japan Patent Office, the entire contents of which are hereby incorporated by reference.

The invention claimed is:

1. A positive electrode active material for a non-aqueous electrolyte secondary battery, comprising:
   lithium-nickel composite oxide particles having a layer structure of hexagonal system; and
   a lithium tungstate coating film disposed on a surface of secondary particles of the lithium-nickel composite oxide particles,
   wherein the positive electrode active material for the non-aqueous electrolyte secondary battery includes, as metallic elements, lithium (Li), nickel (Ni), cobalt (Co), element M (M) which is at least one element selected from Mn, V, Mg, Mo, Nb, Ti, Ca, Cr, Zr, Ta, and Al, and tungsten (W), wherein a ratio of amount of substance in the metallic elements contained is Li:Ni:Co:M:W=a:1-x-y:x:y:z, wherein $0.97 \leq a \leq 1.25$, $0 \leq x \leq 0.35$, $0 \leq y \leq 0.35$, and $0.007 \leq z \leq 0.020$, wherein a ratio of a maximum tungsten concentration to an average tungsten concentration is 5 or more and 25 or less when a line analysis is performed by STEM-EDX on a particle cross-section of the positive electrode active material for the non-aqueous electrolyte secondary battery, and wherein a volume resistivity of the positive electrode active material when compressed to 3.2 g/cc as determined by a powder resistivity measurement is $1.0 \times 10^2$ Ω·cm or more and $1.0 \times 10^4$ Ω·cm or less.

2. The positive electrode active material for the non-aqueous electrolyte secondary battery according to claim 1, wherein a crystalline phase of the lithium tungstate on the surface of the secondary particles is at least one selected from $7Li_2WO_4 \cdot 4H_2O$, $Li_2WO_4$, and $Li_4WO_5$.

3. The positive electrode active material for the non-aqueous electrolyte secondary battery according to claim 1, wherein a specific surface area as measured by a BET method is 0.2 m²/g or more and 0.8 m²/g or less.

4. The positive electrode active material for the non-aqueous electrolyte secondary battery according to claim 1, wherein a volume average particle size Mv of the positive electrode active material for the non-aqueous electrolyte secondary battery is 5 μm or more and 20 μm or less.

5. A non-aqueous electrolyte secondary battery comprising:

the positive electrode active material for the non-aqueous electrolyte secondary battery of claim 1.

* * * * *